Sept. 1, 1936.  W. G. DUNN  2,052,816
WIND DRIVEN GENERATOR STRUCTURE
Filed June 1, 1936
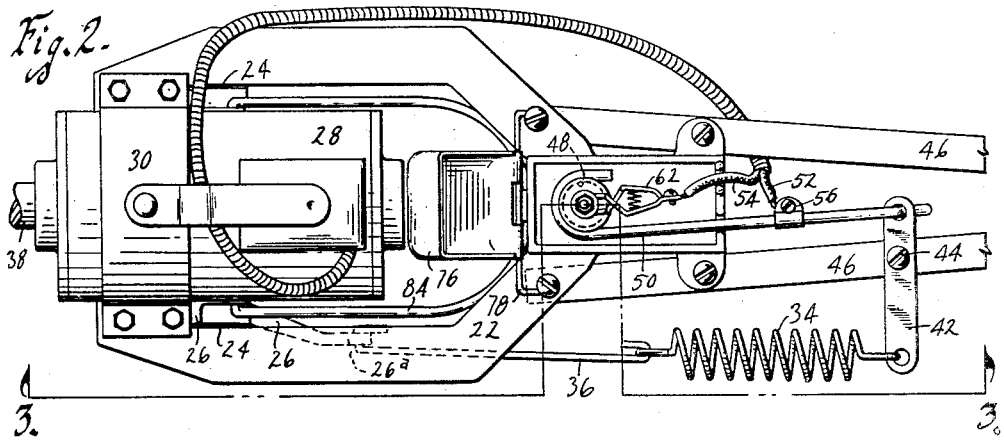
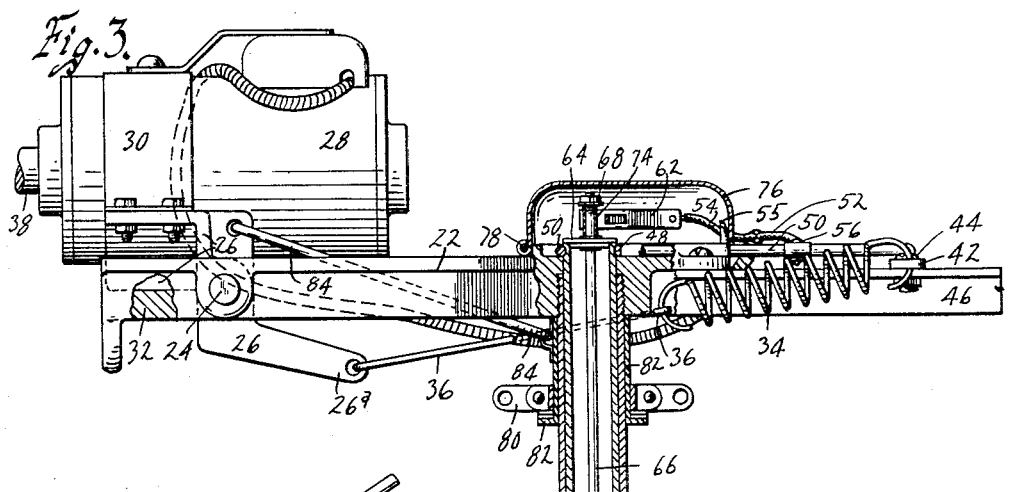
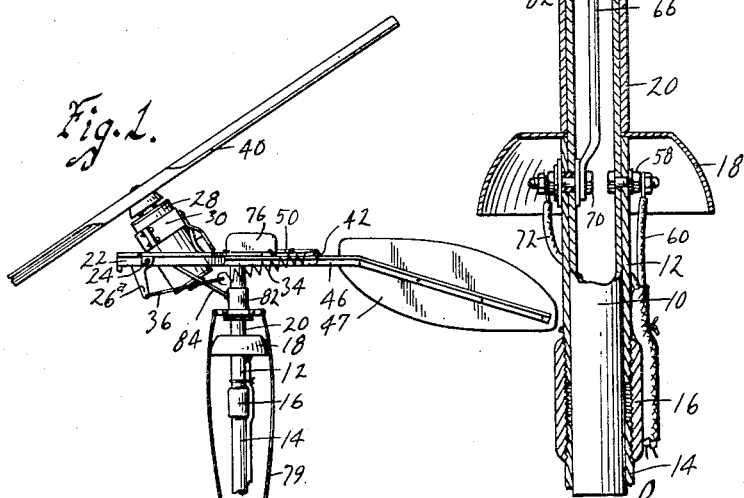

Patented Sept. 1, 1936

2,052,816

UNITED STATES PATENT OFFICE 2,052,816

WIND DRIVEN GENERATOR STRUCTURE

William G. Dunn, Clarinda, Iowa

Application June 1, 1936, Serial No. 82,873

20 Claims. (Cl. 290—55)

An object of my present invention is to provide a wind driven generator structure of simple, durable and inexpensive construction, and having improved features over the generator disclosed in my Patent Number 2,026,828, issued January 7, 1936.

A further object is to provide in connection with a self governing wind driven generator a means to counteract the gyroscopic action of the propeller, which action tends to rotate the entire structure about a vertical axis against the tendency of a vane acting to point the generator into the wind.

More particularly one object of my present invention is to provide a vertical support relative to which a wind driven generator structure can rotate on a vertical axis, the generator structure carrying an element which frictionally engages the support and tends to effect a reduction in the tendency of the structure to rotate about the vertical axis, due to the gyroscopic action of a propeller carried by the structure when the propeller assumes a position out of its normal vertical plane, due to excess pressure of wind thereagainst.

A further object is to provide in connection with a propeller which tips backwardly, due to wind pressure, against the action of a spring a frictional means to discourage rotation of the entire structure on its vertical axis, the frictional effect of the frictional means being increased in proportion to the tipping movement of the propeller by connecting the spring with the frictional means.

A further object is to so design a vertical support for the wind driven generator structure that the matter of current conduction from the generator to a stationary part of the support is reduced to its simplest form, yet is fully effective to provide efficient conduction of current across contacting surfaces of the rotatably mounted generator structure and stationary support.

With these and other objects in view, my invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of my wind driven generator structure showing the generator in a tipped-back position due to excessive wind pressure against the propeller thereof.

Figure 2 is an enlarged plan view of a portion of the structure, a cover being swung back from a part thereof to show the association of the elements; and Figure 3 is a side elevation, a part of which is sectioned on the line 3—3 of Figure 2.

On the accompanying drawing I have used the reference numeral 10 to indicate a support which is preferably made of pipe or other tubular material. This support is reinforced by a tube or pipe 12, which may be connected with a further supporting pipe 14 by a coupling 16 or the like, the pipe 14 in turn being supported on either a tower or roof as desired. The upper end of the pipe 12 serves as a shoulder for a cover guard 18 to rest against.

A further pipe 20 is rotatably mounted on the support 10 and limited against downward movement by the guard 18. The pipe 20 is freely rotatable on the pipe 10 and supports a frame 22, the two being fastened together in any suitable manner, a screw threaded connection being shown for this purpose in Figure 3.

The frame 22 supports a horizontal pivot pin 24 on which a frame 26 is pivoted. A generator 28 is clamped in the frame 26 by a band 30. The frame 26 normally engages a cross bar 32 on the frame 22 which acts as a stop therefor. The frame 26 is urged into engaging position with the stop 32 by a spring 34 having one end connected by a link 36 to an arm 26a of the frame 26. In the stopped position the shaft 38 of the generator 28 is in a horizontal position and the propeller 40 on the shaft 38 in a vertical plane. The other end of the spring 34 is connected to a lever 42, pivoted at 44 on an angle bar 46. Two angle bars 46 are provided which support a vane 47 for the purpose of pointing the propeller 40 into the wind.

The upper end of the support 10 is provided with an annular groove 48 in which the hook end of a rod 50 is seated. This rod has its opposite end pivoted to the lever 42 so that the spring 34 tends to cause the rod 50 to frictionally engage the support 10. Current carrying wires 52 and 54 extend from the generator 28 and the wire 52 is electrically connected by a clamp 56 with the rod 50. Thus the rod 50 frictionally engaging the groove 48 of the support 10 serves as a collector ring connection between the generator and the support. The support is provided with a terminal bolt 58 located below the guard 18 to which is connected a current supply wire 60. The other current carrying wire 54 has a yielding member, such as a spring clamp 62, connected with its free end.

A washer 64 of insulating material is seated against the top of the support 10, and a current conductor 66 extends through it as shown in Figure 3. The upper end of this conductor is provided with a nut 68, while the lower end is bolted by a bolt 70 through the pipes 10 and 12. Suitable insulating washers and bushings are provided on the bolt 70 to prevent a short circuit between the conductor 66 and the support 10. A second current supply wire 72 is connected from the bolt 70.

Between the nut 68 and the washer 64 a sleeve 74 of copper or the like is provided which the jaws of the spring clamp 62 frictionally engage. This provides a second collector ring connection so that the current generated by the generator 28 is conducted from the generator structure, which can rotate on the support 10, to the wires 60 and 72, which are stationary. The hook end of the rod 50 also serves as a means to limit upward thrust of the pipe 20 relative to the support 10 and to retain the parts assembled.

I preferably provide a cover or guard 76 for the upper end of the support 10, which is pivoted on a rod 78 so that it can be swung back when it is desirable to perform any kind of operation or repair on the parts enclosed thereby. It is shown swung back in Figure 2.

Practical operation

With the particular provision of parts and their relation as described in the foregoing specification, a number of advantages are secured which are particularly desirable in connection with a self governing wind generator.

When the propeller is rotating and driving the generator armature, a torque or twisting force is applied to the generator housing which is held from rotation by the band 30. However, when excessive wind pressure forces the propeller from a vertical toward a horizontal position the axis of the generator is changed inversely from the horizontal toward the vertical, or parallel with the axis of the support 10. The axis of the generator now being parallel with the axis of support, the entire mechanism is induced by the armature torque to turn the generator housing and therefore the entire head about the support 10, thereby causing erratic performance of the machine in its self-governing capacity.

The spring 34 tends to maintain a good frictional engagement between the hook end of the rod 50 and the support 10, thus providing friction for reducing the tendency of the supporting frame to thus rotate about its vertical axis (the support 10) when the propeller 40 tips back, as shown in Figure 1, due to excess wind pressure thereagainst.

By connecting the spring 34 with the arm 26a, it serves the double purpose of counteracting the tendency of the propeller 40 to tip back, which is essential as such tipping-back must be opposed, and automatically increases the frictional engagement of the rod 50 with the support 10 in proportion to the degree of movement in a tipping-back direction. Because of the frictional engagement between the rod 50 and the support 10, these two parts provide an excellent electrical connection, permitting relative movement between the generator structure and the support, and accordingly I connect the wire 52 with the rod 50.

Further by the provision of the conductor 66 and the clamp 62 in the position illustrated with respect to the other parts, it is possible to greatly simplify the construction, yet secure a support for the structure which can be modified in a great number of ways to permit installation under various circumstances as the fixed conductor connections terminate at the terminals 58 and 70. The support below these terminals can be modified in any fashion found desirable, and the current supply wires 60 and 72 supported in any feasible manner without interference with the support, as is sometimes found in connection with the type of support shown in my prior patent.

The structure has also been engineered to facilitate assembly and dissembly whenever desired. By tipping the cover 76 backwardly, the spring clamp 62 can be removed and then the spring 34 unhooked, whereupon the rod 50 can be unhooked. The entire generator structure, including the pipe 20, can then be lifted off of the support 10 and replaced with another structure or taken to a position where ready access can be had to the parts for repair, cleaning or the like. This obviously can be done in a minimum of time, and likewise when the generator structure is again associated with the support 10, the parts can be quickly connected for operation.

The parts are also so arranged that a pair of wires 79 extending downwardly from a collar 80 can be moved downwardly to in turn move a sleeve 82 downwardly, and through a link 84 manually tip the propeller 40 back to a partially operative or inoperative position when desired, without these wires interfering with the electrical connections. The collar 80 being rotatably mounted on the sleeve 82, may remain stationary while the sleeve rotates with the wind driven generator structure due to changes in the direction of the wind.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A wind driven generator structure comprising a frame mounted on a vertical pivot, a vane for maintaining said frame in desired position relative to the direction of the wind, a generator pivotally mounted on a horizontal axis on said frame, a propeller for driving said generator and having its axis of rotation vertically spaced from said horizontal axis, a spring tending to maintain said generator in position with said axis of rotation horizontal, an element frictionally operable to reduce the tendency of said frame to rotate on its vertical pivot said spring being connected with said element to increase the frictional effect thereof upon movement of said propeller from position with said axis of rotation horizontal due to the pressure of wind thereagainst.

2. In a wind driven generator structure, a frame pivoted on a vertical axis, a vane for maintaining said frame in a predetermined position relative to the direction of the wind, a horizontal pivot pin supported by said frame, propeller shaft journalling means mounted on said pivot pin, a propeller shaft journalled therein and vertically spaced from said pin, a propeller mounted on said propeller shaft, means tending to normally maintain said propeller in a vertical plane, a generator driven by said propeller shaft, an element frictionally operable to decrease the tendency of said frame to rotate on its vertical axis, said means being operably connected therewith to increase the frictional effect thereof upon movement of said propeller from position in a vertical plane due to an excess pressure of wind thereagainst.

3. In a wind driven generator structure, a frame pivoted on a vertical axis, a vane for maintaining said frame in a predetermined position relative to the direction of the wind, a horizontal pivot pin supported by said frame, propeller shaft journalling means mounted on said pivot pin, a propeller shaft journalled therein and vertically spaced from said pin, a propeller mounted on said propeller shaft, means tending to normally maintain said propeller in a vertical plane, a generator driven by said propeller shaft, adjustable friction means tending to prevent rotation of said frame on its vertical axis and means for interconnecting said adjustable friction means and said propeller shaft journalling means for increasing the friction of said adjustable friction means in proportion to movement of said journalling means relative to said frame from position with said propeller in a vertical plane.

4. In a wind driven generator structure, a vertical support, a frame pivoted thereon for rotation thereabout in a horizontal plane, friction means opposing such rotation, a propeller driven generator pivoted on said frame for movement to a tipped-back position upon excess wind pressure being applied thereto, resilient means opposing such movement, said resilient means being operatively connected with said friction means to increase the friction thereof upon movement of said propeller driven generator to a tipped-back position.

5. In a wind driven generator structure, a vertical support, a frame pivoted thereon for rotation thereabout in a horizontal plane, an element frictionally engaging said support to reduce the tendency of said frame to rotate, a propeller driven generator pivotally mounted on said frame and movable to a tipped-back position upon excessive wind pressure being applied to the propeller thereof, resilient means opposing such movement and operatively connected with said element to increase the engagement pressure thereof against said support in proportion to the movement of said propeller driven generator toward tipped-back position.

6. In a wind driven generator structure, a vertical support, a frame pivoted thereon for rotation thereabout in a horizontal plane, an element frictionally engaging said support to reduce the tendency of said frame to rotate in said horizontal plane, a propeller driven generator pivotally mounted on said frame for movement to a tipped-back position upon excessive wind pressure applied thereto, a current carrying wire extending from said generator to said element, a current supply wire connected with said support, resilient means opposing movement of said propeller driven generator to a tipped-back position, said resilient means being operatively connected with said element to increase the engagement pressure thereof against said support upon movement of said propeller driven generator to a tipped-back position.

7. In a wind driven generator structure, a vertical support, a frame pivoted thereon for rotation thereabout in a horizontal plane, an element frictionally engaging said support to reduce the tendency of said frame to rotate in said horizontal plane, a propeller driven generator pivotally mounted on said frame for movement to a tipped-back position upon excess wind pressure against the propeller thereof, a pair of current carrying wires extending from said generator, one of said wires being connected with said element, a yielding member on the other of said wires, resilient means opposing movement of said propeller driven generator to a tipped-back position, said resilient means being connected with said element to increase the engagement pressure thereof against said support, a current conductor supported by said support and insulated therefrom, said resilient member frictionally engaging said current conductor and current supply wires connected with said support and current conductor.

8. In a wind driven generator structure, a vertical support, a frame pivoted thereon for rotation thereabout in a horizontal plane, an element frictionally engaging said support to reduce the tendency of said frame to rotate in said horizontal plane, a propeller driven generator mounted on said frame, resilient means connected with said element to cause such frictional engagement thereof with said support, a current carrying wire extending from said generator to said element and a current supply wire connected with said support.

9. In a wind driven generator, a vertical support, a frame pivoted thereon for rotation thereabout in a horizontal plane, an element frictionally engaging said support to reduce the tendency of said frame to rotate in said horizontal plane, a propeller driven generator mounted on said frame, resilient means connected with said element to cause such frictional engagement thereof with said support, and a pair of current carrying wires extending from said generator, one of said wires being connected with said element, a yielding member connected with the other of said wires, a current conductor supported by said support and insulated therefrom, said yielding member frictionally engaging said current conductor and current supply wires connected with said support and current conductor.

10. In a wind driven generator, a vertical support, a frame pivoted thereon for rotation thereabout in a horizontal plane, an element frictionally engaging said support to reduce the tendency of said frame to rotate in said horizontal plane, a propeller driven generator mounted on said frame, and a pair of current carrying wires extending from said generator, one of said wires being connected with said element, a yielding member connected with the other of said wires, a current conductor supported by said support and insulated therefrom, said yielding member frictionally engaging said current conductor and current supply wires connected with said support and current conductor.

11. In a wind driven generator structure, a support, a frame pivoted thereon for rotation thereabout in a horizontal plane, an element frictionally engaging said support to reduce the tendency of said frame to rotate in said horizontal plane, a propeller driven generator mounted on said frame, a current carrying wire extending from said generator to said element and a current supply wire connected with said support.

12. In a wind driven generator structure, a vertical support, a frame pivoted thereon for rotation thereabout in a horizontal plane, friction means opposing such rotation, a propeller driven generator pivoted on said frame for movement to a tipped-back position upon excess wind pressure being applied thereto, said propeller driven generator being operatively connected with said friction means to increase the friction thereof upon movement of said propeller driven generator to a tipped-back position.

13. In a wind driven generator structure, a vertical support, a frame pivoted thereon for rotation thereabout in a horizontal plane, an element frictionally engaging said support to reduce the tendency of said frame toward such rotation, a propeller driven generator pivotally mounted on said frame and movable to a tipped-back position upon excessive wind pressure being applied to the propeller thereof, said propeller driven generator being operatively connected with said element to increase the engagement pressure thereof against said support in proportion to the movement of said propeller driven generator toward tipped-back position.

14. In a wind driven generator structure, a vertical support, a frame pivoted thereon for rotation thereabout in a horizontal plane, an element frictionally engaging said support to reduce the tendency of said frame to rotate in said horizontal plane, a propeller driven generator pivotally mounted on said frame for movement to a tipped-back position upon excessive wind pressure applied thereto, a current carrying wire extending from said generator to said element, a current supply wire connected with said support, said generator being operatively connected with said element to increase the engagement pressure thereof against said support upon movement of said propeller driven generator to a tipped-back position.

15. In a wind driven generator structure, a vertical support, a frame pivoted thereon for rotation thereabout in a horizontal plane, an element frictionally engaging said support to reduce the tendency of said frame to rotate in said horizontal plane, a propeller driven generator pivotally mounted on said frame for movement to a tipped-back position upon excess wind pressure against the propeller thereof, a pair of current carrying wires extending from said generator, one of said wires being connected with said element, a yielding member on the other of said wires, said propeller driven generator being connected with said element to increase the engagement pressure thereof against said support, a current conductor supported by said support and insulated therefrom, said yielding member frictionally engaging said current conductor and current supply wires connected with said support and current conductor.

16. In a wind driven generator structure, a frame pivoted on a vertical axis, a vane for maintaining said frame in a predetermined position relative to the direction of the wind, a horizontal pivot pin supported by said frame, propeller shaft journalling means mounted on said pivot pin, a propeller shaft journalled therein and vertically spaced from said pin, a propeller mounted on said propeller shaft and friction means tending to prevent rotation of said frame on its vertical axis.

17. In a wind driven generator structure, a frame pivoted on a vertical axis, a vane for maintaining said frame in a predetermined position relative to the direction of the wind, a horizontal pivot pin supported by said frame, propeller shaft journalling means mounted on said pivot pin, a propeller shaft journalled therein and vertically spaced from said pin, a propeller mounted on said propeller shaft, means tending to normally maintain said propeller in a vertical plane, a generator driven by said propeller shaft and an element frictionally operable to decrease the tendency of said frame to rotate on its vertical axis upon movement of said propeller from position to a vertical plane against the action of said means and due to an excess pressure of wind thereagainst.

18. A wind driven generator structure comprising a support, a frame mounted thereon and rotatable relative thereto, a vane for maintaining said frame in desired position relative to the direction of the wind, a generator pivotally mounted on said frame, a propeller for driving said generator and having its axis of rotation vertically spaced from the pivotal connection of said generator to said frame, a spring tending to maintain said generator in position with said axis of rotation horizontal, an element carried by said frame and frictionally engaging said support to reduce the tendency of said frame to rotate relative to said support upon movement of said propeller from position with said axis of rotation horizontal due to the pressure of wind thereagainst, said spring being connected with said element to increase the frictional effect thereof upon such movement occurring and in proportion to the degree of such movement.

19. In a wind driven generator, a vertical support, a frame pivoted thereon for rotation thereabout in a horizontal plane, an element frictionally engaging said support to reduce the tendency of said frame to rotate in said horizontal plane, a propeller driven generator mounted on said frame, and a pair of current carrying wires extending from said generator, one of said wires being connected with said element, a spring clamp connected with the other of said wires, a current conductor supported by said support and insulated therefrom, said support being tubular and said current conductor extending therethrough with its upper terminal end projecting thereabove, said spring clamp frictionally engaging said terminal end and current supply wires connected with said support and current conductor.

20. In a wind driven generator structure, a frame pivoted thereon for rotation support, a frame pivoted thereon for rotation thereabout in a horizontal plane, an element frictionally engaging said support to reduce the tendency of said frame to rotate in said horizontal plane, a propeller driven generator mounted on said frame, a current carrying wire extending from said generator to said element, said support having an annular groove above said frame to receive said element and thereby retain said frame assembled on said support and a current supply wire connected with said support.

WILLIAM G. DUNN.